A. J. VERSLUIS.
POT OR PAIL COVER.
APPLICATION FILED AUG. 10, 1910.
1,122,557.
Patented Dec. 29, 1914.
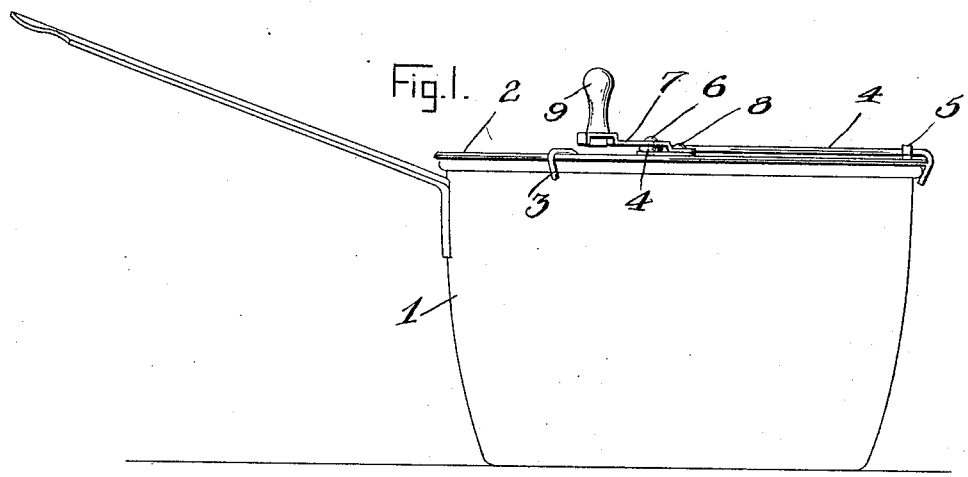
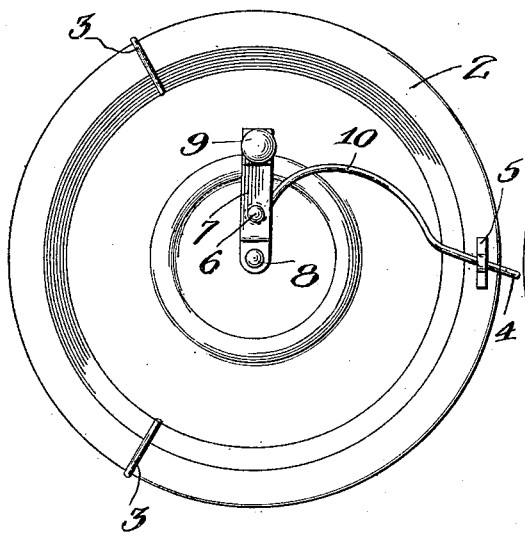
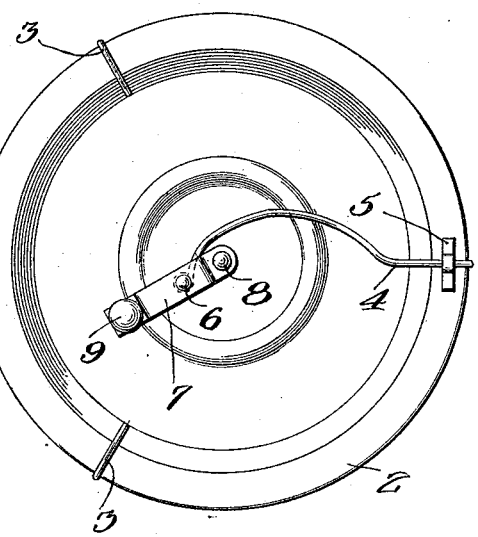

UNITED STATES PATENT OFFICE.

AUGUST JOHN VERSLUIS, OF MOLINE, ILLINOIS, ASSIGNOR OF ONE-HALF TO ARTHUR BURRALL, OF ROCK ISLAND, ILLINOIS.

POT OR PAIL COVER.

1,122,557. Specification of Letters Patent. Patented Dec. 29, 1914.

Application filed August 10, 1910. Serial No. 576,568.

*To all whom it may concern:*

Be it known that I, AUGUST J. VERSLUIS, a citizen of the United States, residing at Moline, in the county of Rock Island and State of Illinois, have invented certain new and useful Improvements in Pot or Pail Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pot lids or covers, and it has for its object to provide a fastening device by which the cover or lid may be readily and effectively locked to the pot or pail without liability of the fastening becoming accidentally unlocked and by which also the fastening can be readily and quickly unlocked when it is desired to disengage the cover or lid from the pot or pail.

To the accomplishment of the foregoing and such other objects as may hereinafter appear the invention consists in the features of construction hereinafter particularly described and then sought to be clearly defined by the claims reference being had to the accompanying drawing forming a part hereof and in which:

Figure 1 is a side elevation of a pot or pail showing its cover or lid secured thereto by the fastener; Fig. 2 is a plan view of the same parts, showing the fastening in its unlocked position, and Fig. 3 is a similar view showing the fastening in its position when locking the cover or lid to the pot.

In the drawing the numeral 1 designates a pot or pail of any approved type and 2 designates a cover or lid for the same. This cover or lid may be and usually will be provided with two permanently attached hooks or lips 3, formed of wire or otherwise, disposed at appropriate points on the lid or cover so that when the latter is in position on the pot or pail said hooks will have interlocking engagement with the upper edge or rim of the pot or pail as illustrated in Fig. 1 of the drawing. The lid or cover is also provided with a movable fastening adapted to be brought into or out of interlocking engagement with the upper edge or rim of the pot or pail by manipulation of a suitable handle, so that when the fastening is in one position it will engage or interlock with the edge or rim of the pot or pail so as to securely lock the lid or cover on the pot or pail, said fastening in such position being locked so as to prevent accidental disengagement of the fastening with the pot or pail. In the preferred construction this fastening comprises a sliding hook 4 which is free to be moved back and forth through an eye or keeper 5 formed as a part of or secured to the lid or cover in any preferred manner, said hook being connected, for instance, by a pin 6 to a rotatable handle 7 which is pivotally connected to the lid or cover by a pin 8, and said handle for convenience of manipulation may have a hand grip member 9. The sliding hook 4 is preferably formed of a stout spring wire and is curved throughout a portion of its length so as to form what for convenience will be designated as an arched neck portion 10 which is capable of being distended and contracted so as to have some degree of resiliency in the manipulation of the hook during the operation of locking and unlocking the cover to the pail or pot. When the handle 7 is turned in one direction the hook 4 will be drawn inwardly so that its outer end will grasp or interlock with the upper edge or rim of the pot or pail and when the handle is moved far enough to carry the opposite end of the rod beyond the center of the pivot 8, as illustrated in Fig. 3 of the drawing, the hook will be locked in its inner position and at such time the curved neck of the rod will be somewhat distended as indicated in Fig. 3 of the drawing so that the parts will be securely locked under tension in that position and the lid or cover will be held securely to the pot or pail. When the handle is turned to the position indicated in Fig. 2 of the drawing the hook 4 will be moved outward from interlocking engagement with the pail or pot and the cover can then be readily lifted from off the latter, and the contraction of the spring of the hook will facilitate moving the hook to its unlocked position when the handle 7 is turned to bring the end of the hook attached thereto to the other side of the center of the pivot pin 8.

By the construction described a very simple and efficient means is provided for locking the lid or cover to the pail or pot, and when in locked position there is no liability of the fastening becoming accidentally disconnected from locking engagement with the pot or pail, and the pot is capable of manipulation in different positions and locations without liability of accidentally separating the cover or lid therefrom. The device is of few parts and not liable to get out of repair and is comparatively inexpensive in construction and application.

I have illustrated and described with particularity the preferred details of construction and relative arrangement of the several parts but it is obvious that changes can be made therein without departing from the essential features of the invention as defined in the appended claims.

Having described my invention and set forth its merits what I claim is:

1. A vessel cover provided with a fastener comprising a sliding member of resilient material having a straight and a curved portion and formed with a hook at one end to engage the rim of a vessel, a pivoted rotatable handle, the sliding member being connected with the handle between the pivot and free end of the handle so as to be held in locking position when the handle is thrown beyond its center, and a guide for the sliding member, substantially as described.

2. A vessel cover provided with a fastener comprising a slidable member formed at one end with a hook adapted to engage the rim of a vessel and formed of resilient material bent to form a spring, and an operating handle connected with the sliding member and pivotally mounted upon the cover so as to be turned to spread the spring and lock the sliding member in holding position, substantially as described.

In testimony whereof I affix my signature in presence of two witnesses.

AUGUST JOHN VERSLUIS.

Witnesses:
 OLIVER OLSEN,
 CURTIS C. COULTER.

Copies of this patent may be obtained for five cents each, by addressing the "Commissioner of Patents, Washington, D. C."